United States Patent
Nichols et al.

(10) Patent No.: US 9,508,315 B2
(45) Date of Patent: Nov. 29, 2016

(54) ORDERING RAYS IN RENDERED GRAPHICS FOR COHERENT SHADING

(71) Applicant: Disney Enterprises, Inc., Burbank, CA (US)

(72) Inventors: Gregory Nichols, North Hollywood, CA (US); Brent Burley, Monterey Park, CA (US); Andrew Selle, Montrose, CA (US); Christian Eisenacher, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 195 days.

(21) Appl. No.: 13/790,213

(22) Filed: Mar. 8, 2013

(65) Prior Publication Data

US 2014/0253576 A1    Sep. 11, 2014

(51) Int. Cl.
*G09G 5/02* (2006.01)
*G06T 15/06* (2011.01)

(52) U.S. Cl.
CPC ............ *G09G 5/02* (2013.01); *G06T 15/06* (2013.01)

(58) Field of Classification Search
CPC ....... G06T 15/30; G06T 15/50; G06T 15/06; G09G 5/02
See application file for complete search history.

(56) References Cited

U.S. PATENT DOCUMENTS

| | | | |
|---|---|---|---|
| 5,045,995 A | 9/1991 | Levinthal | |
| 5,923,330 A | 7/1999 | Tarlton | |
| 6,326,964 B1 | 12/2001 | Snyder | |
| 6,496,601 B1 * | 12/2002 | Migdal et al. | 382/239 |
| 6,714,936 B1 | 3/2004 | Nevin | |
| 7,095,409 B2 | 8/2006 | Cook | |
| 7,129,940 B2 | 10/2006 | Cook | |
| 7,168,074 B1 | 1/2007 | Srinivasa | |
| 7,289,119 B2 | 10/2007 | Heirich | |
| 7,675,518 B1 | 3/2010 | Miller | |
| 7,783,695 B1 | 8/2010 | Tyrrell | |
| 8,106,906 B1 | 1/2012 | Duff | |
| 8,174,524 B1 | 5/2012 | Laur | |
| 8,217,949 B1 | 7/2012 | Carpenter | |
| 8,400,447 B1 | 3/2013 | Carr | |
| 8,411,082 B1 | 4/2013 | Cook | |

(Continued)

OTHER PUBLICATIONS

"Two-Level Ray Tracing with Reordering for Highly Complex Scenes", Hanika, et. al. GI '10 Proceedings of Graphics Interface 2010 pp. 145-152.

(Continued)

*Primary Examiner* — Michelle Chin
(74) *Attorney, Agent, or Firm* — Farjami & Farjami LLP

(57) ABSTRACT

There is provided a system and a method for ordering rays in rendered graphics for coherent shading. The method comprises recording, using the processor, intersection points for each of a plurality of directional queries in the memory, wherein each of the plurality of directional queries has one intersection point, organizing, using the processor, the intersection points in the memory into a plurality of elements, and grouping, using the processor, the intersection points in the memory by shading context. The method may further comprise shading the intersection points, wherein the shading is performed on a plurality of elements substantially concurrently. The shading context may include a volume of intersection points. In another implementation, the shading context may be one of texture ID, material ID, and element ID. Additionally, the texture ID may correspond to a mesh face ID.

16 Claims, 3 Drawing Sheets

(56) References Cited

U.S. PATENT DOCUMENTS

| | | | |
|---|---|---|---|
| 8,416,260 | B1 | 4/2013 | Carpenter |
| 8,436,856 | B1 | 5/2013 | Duff |
| 8,436,867 | B1 | 5/2013 | Duff |
| 8,466,919 | B1 | 6/2013 | Duff |
| 8,493,383 | B1 | 7/2013 | Cook |
| 2002/0050990 | A1* | 5/2002 | Sowizral et al. ............ 345/421 |
| 2005/0146522 | A1* | 7/2005 | Maillot ........................ 345/423 |
| 2005/0243086 | A1 | 11/2005 | Schechter |
| 2006/0209067 | A1 | 9/2006 | Pellacini |
| 2007/0262988 | A1 | 11/2007 | Christensen |
| 2009/0167763 | A1* | 7/2009 | Waechter ................ G06T 15/06 345/426 |
| 2009/0225081 | A1* | 9/2009 | Keller .................... G06T 15/40 345/426 |
| 2009/0262132 | A1 | 10/2009 | Peterson |
| 2010/0231589 | A1* | 9/2010 | Salsbury et al. ............. 345/426 |
| 2011/0032257 | A1 | 2/2011 | Peterson |
| 2012/0147015 | A1 | 6/2012 | Rogers |
| 2013/0016107 | A1 | 1/2013 | Dharmapurikar |
| 2014/0285499 | A1 | 9/2014 | Iwasaki |

OTHER PUBLICATIONS

Áfra, A., "Incoherent Ray Tracing without Acceleration Structures", Eurographics 2012 Short Paper, 4 pages.

Aila et al. 2010. Architecture considerations for tracing incoherent rays. In *Proceedings of the Conference on High Performance Graphics* (HPG '10). Eurographics Association, Aire-la-Ville, Switzerland, Switzerland, 113-122.

Arvo et al., Fast ray tracing by ray classification, Proceedings of the 14th annual conference on Computer graphics and interactive techniques, p. 55-64, Aug. 1987 [doi>10.1145/37401.37409].

Benthin et al., Combining Single and Packet-Ray Tracing for Arbitrary Ray Distributions on the Intel MIC Architecture, IEEE Transactions on Visualization and Computer Graphics, v.18 n.9, p. 1438-14.

Bikker, J., Improving Data Locality for Efficient In-Core Path Tracing, Computer Graphics Forum, v.31 n.6, p. 1936-1947, Sep. 2012 [doi>10.1111/j.1467-8659.2012.03073.x].

Boulos et al.: Adaptive ray packet reordering. In *Proc. of Interactive Ray Tracing* (2008).

Budge et al.: Out-of-core data management for path tracing on hybrid resources. In *Computer Graphics Forum* (2009).

Christensen et al., "Ray Tracing for the Movie 'Cars'", Interactive Ray Tracing 2006, IEEE Symposium, Sep. 18-20, 2006, pp. 1-6.

Crassin et al. (2011), Interactive Indirect Illumination Using Voxel Cone Tracing. Computer Graphics Forum, 30: 1921-1930. doi: 10.1111/j.1467-8659.2011.02063.x.

Dammertz et al., Shallow bounding volume hierarchies for fast SIMD ray tracing of incoherent rays, Proceedings of the Nineteenth Eurographics conference on Rendering, Jun. 23-25, 2008, Sarajevo, Bosnia and Herzegovina.

Ernst et al.: Multi bounding volume hierarchies. In Proc. of Interactive Ray Tracing (2008).

Garanzha et al.: Fast ray sorting and breadth-first packet traversal for GPU ray tracing. *Computer Graphics Forum* (2010).

Gribble et al.: Coherent ray tracing via stream filtering. In *Proc. of Interactive Ray Tracing* (2008).

Hanika et al., Two-level ray tracing with reordering for highly complex scenes, Proceedings of Graphics Interface 2010, May 31-Jun. 2, 2010, Ottawa, Ontario, Canada.

Hanrahan, P., Using caching and breadth-first search to speed up ray-tracing, Proceedings on Graphics Interface '86/Vision Interface '86, p. 56-61, Aug. 1986, Vancouver, British Columbia, Canada.

Hoberock et al., Stream compaction for deferred shading, Proceedings of the Conference on High Performance Graphics 2009, Aug. 1-3, 2009, New Orleans, Louisiana [doi>10.1145/1572769.1572797].

Kato et al., "Parallel Rendering and the Quest for Realism: The 'Kilauea' Massively Parallel Ray Tracer", Practical Parallel Processing for Today's Rendering Challenges, SIGGRAPH 2001, Course Note #40, ACM, Aug. 2001, Los Angeles, USA, Aug. 12-17, 1 p.

Kato, T., "Kilauea": parallel global illumination renderer, Proceedings of the Fourth Eurographics Workshop on Parallel Graphics and Visualization, Sep. 9-10, 2002, Blaubeuren, Germany.

Keller et al., "Efficient Ray Tracing without Auxiliary Acceleration Data Structure", HPG 2011, 1 page.

Moon et al., Cache-oblivious ray reordering, ACM Transactions on Graphics (TOG), v.29 n.3, p. 1-10, Jun. 2010 [doi>10.1145/1805964.1805972].

Nakamaru et al., Breadth-First Ray Tracing Utilizing Uniform Spatial Subdivision, IEEE Transactions on Visualization and Computer Graphics, v.3 n. 4, p. 316-328, Oct. 1997 [doi>10.1109/2945.646235].

Navratil et al., Dynamic Ray Scheduling to Improve Ray Coherence and Bandwidth Utilization, Proceedings of the 2007 IEEE Symposium on Interactive Ray Tracing, p. 95-104, Sep. 10-12, 2007 [doi>10.

Overbeck et al.: Large ray packets for real-time Whitted ray tracing. In *Proc. of Interactive Ray Tracing* (2008).

Pantaleoni et al., PantaRay: fast ray-traced occlusion caching of massive scenes, ACM Transactions on Graphics (TOG), v.29 n.4, Jul. 2010 [doi>10.1145/1778765.1778774].

Pharr et al., Rendering complex scenes with memory-coherent ray tracing, Proceedings of the 24th annual conference on Computer graphics and interactive techniques, p. 101-108, Aug. 1997 [doi>10.1145/258734.2587.

Ramani et al., 2009. StreamRay: a stream filtering architecture for coherent ray tracing. *SIGPLAN* Not. 44, 3 (Mar. 2009), 325-336. DOI=10.1145/1508284.1508282 http://doi.acm.org/10.1145/1508284.1508282.

Reinhard et al., Hybrid scheduling for parallel rendering using coherent ray tasks, Proceedings of the 1999 IEEE symposium on Parallel visualization and graphics, p. 21-28, Oct. 25-26, 1999, San Francisco, California.

Reshetov et al., Multi-level ray tracing algorithm, ACM Transactions on Graphics (TOG), v.24 n.3, Jul. 2005 [doi>10.1145/1073204.1073329].

Tsakok, J., Faster incoherent rays: Multi-BVH ray stream tracing, Proceedings of the Conference on High Performance Graphics 2009, Aug. 1-3, 2009, New Orleans, Louisiana [doi>10.1145/1572769.1572793].

Wald et al. "SIMD Ray Stream Tracing-SIMD Ray Traversal with Generalized Ray Packets and On-the-fly Re-Ordering." *Informe Técnico, SCI Institute* (2007).

Wald et al., Interactive distributed ray tracing of highly complex models, Proceedings of the 12th Eurographics conference on Rendering, Jun. 1, 2001, London, UK [doi>10.2312/EGWR/EGWR01/277-288].

Wald et al.: Getting rid of packets: efficient SIMD single-ray traversal using multi-branching BVHs. In Proc. of Interactive Ray Tracing (2008).

U.S. Appl. No. 12/043,041, filed Mar. 5, 2008, Titled "Multithreading in Rendering", First Named Inventor: Fong.

U.S. Appl. No. 12/120,711, filed May 15, 2008, Titled "Lagrangian Filtering", First Named Inventor: Carpenter.

U.S. Appl. No. 12/533,965, filed Jul. 31, 2009, Titled "System and Methods for Implementing Object Oriented Structures in a Shading Language", First Named Inventor: Duff.

U.S. Appl. No. 13/280,258, filed Oct. 24, 2011, Titled "Programmable System for Artistic Volumetric Lighting", First Named Inventor: Nowrouzezahrai.

* cited by examiner

ORDERING RAYS IN RENDERED GRAPHICS FOR COHERENT SHADING

BACKGROUND

Realistic lighting is an important component of high quality computer rendered graphics. By utilizing a renderer employing a global illumination model, scenes can be provided with convincing reflections and shadows, providing the requisite visual detail demanded by feature length animated films and other content. Conventionally, a ray tracing renderer may be utilized to provide global illumination in a simple manner. However, with large processing overhead and highly random data access requirements, ray tracing places a heavy processing demand for complex scenes with larger amounts of data, as with feature films and other demanding content.

Typically, when using global illumination in a rendered scene, ray tracing is used to handle light being reflected multiple times before reaching a viewpoint and hit points of rays are recorded and shaded. Accordingly, to keep rendering times manageable and to handle multiple or diffuse reflections, a renderer needs to efficiently order and shade rays in rendered graphics. Conventionally, rays become spread out and incoherent when handling diffuse reflections. Previously, shading caches have been used to amortize cost of incoherent shading, however this limits the effects that can be achieved due to the high cost of memory reads resulting from caches misses. For example, textures typically do not fit in a memory and a cache is required. While large texture caches may be used to cover incoherent texture access, this means that a large percentage of accesses will result in cache misses, incurring high latency to load the texture data into memory.

SUMMARY

The present disclosure is directed to ordering rays in rendered graphics for coherent shading, substantially as shown in and/or described in connection with at least one of the figures, as set forth more completely in the claims.

DETAILED DESCRIPTION

Figure 1:
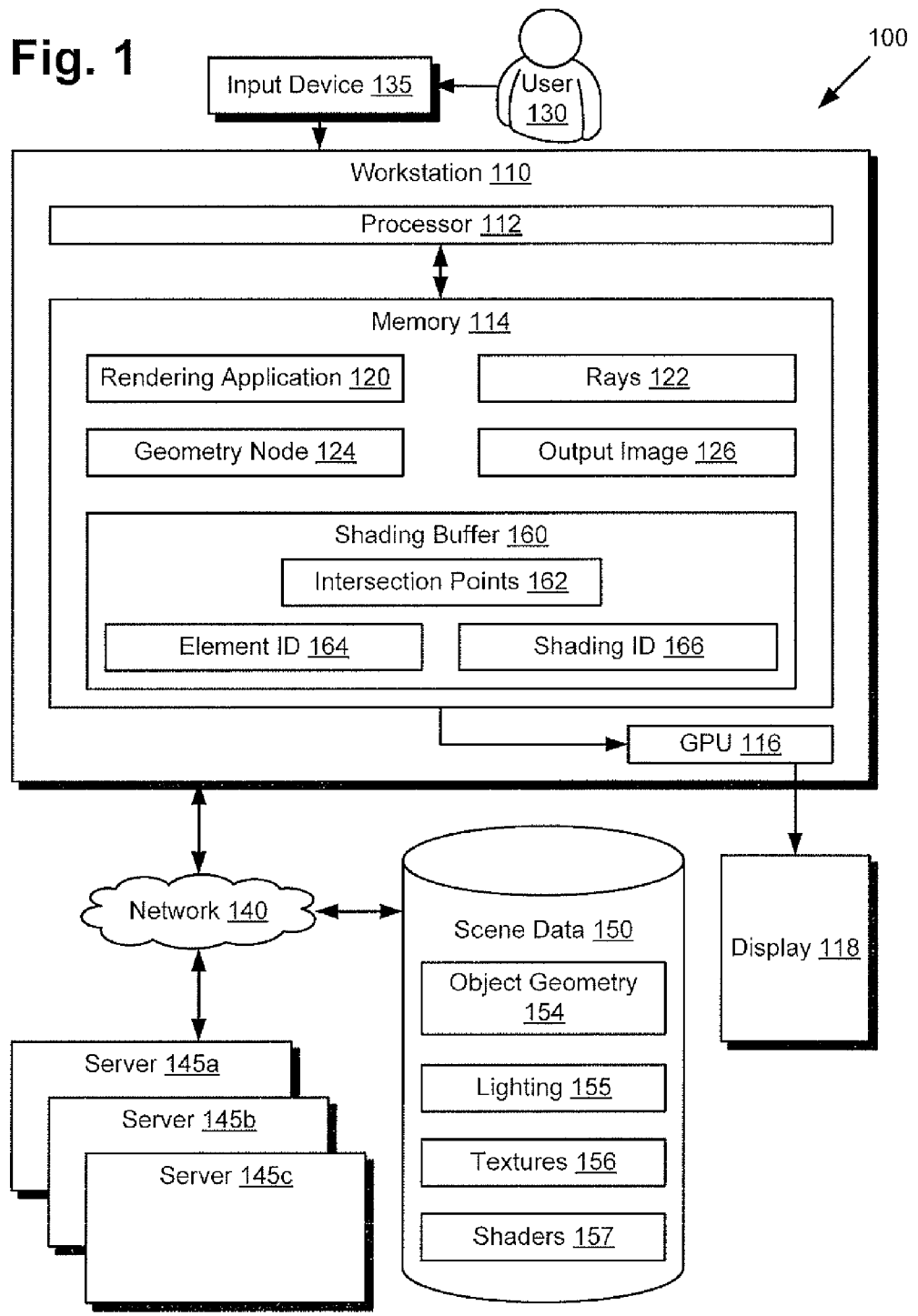
FIG. 1 presents an exemplary diagram of a system for ordering rays in rendered graphics for coherent shading.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Ray tracing is typically used to provide global illumination in rendered graphics where light is simulated and reflected among multiple surfaces before reaching a camera viewpoint. Traditionally, a Monte Carlo algorithm was utilized to handle ray tracing with glossy or diffuse surfaces. However, rays reflected on diffuse surfaces are spread out and incoherent due to the unpredictable pattern rays may travel.

FIG. 1 presents an exemplary diagram of a system for ordering rays in rendered graphics for coherent shading. As shown in FIG. 1, system environment 100 shows user 130 utilizing input device 135 with workstation 110 and display 118. Workstation 110 includes processor 112, memory 114, and graphic processing unit (GPU) 116. Included on memory 114 of workstation 110 is rendering application 120, rays 122, geometry node 124, output image 126 and shading buffer 160 including intersection points 162, element ID 164, shading ID 166, and. Workstation 110 is connected to server 145a, server 145b, and server 145c over network 140. Workstation 110 also receives scene data 150 including object geometry 154, lighting 155, textures 156, and shaders 157 over network 140.

Workstation 110 may correspond to a computing device, such as a server, desktop computer, laptop or mobile computer, or other computing device. Workstation 110 includes processor 112 and memory 114. Processor 112 of workstation 110 is configured to access memory 114 to store received input and/or to execute commands, processes, or programs stored in memory 114. For example, processor 112 may receive data and store the information in memory 114, such as rays 112 and shading buffer 160 having intersection points 162, element ID 164, and shading ID 166. Processor 112 may also access memory 114 and execute programs, processes, and modules stored in memory 114, such as analysis module rendering application 120. Additionally, processor 112 may store in memory 114 data resulting from executed programs, processes and modules, such as output image 124. Processor 112 may correspond to a processing device, such as a microprocessor or similar hardware processing device, or a plurality of hardware devices. However, in other implementations, processor 112 refers to a general processor capable of performing the functions required by workstation 110.

Memory 114 corresponds to a sufficient memory capable of storing commands, processes, and programs for execution by processor 112. Memory 114 may be instituted as ROM, RAM, flash memory, or any sufficient memory capable of storing a set of commands. In other implementations, memory 114 may correspond to a plurality memory types or modules. Thus, processor 112 and memory 114 contain sufficient memory and processing units necessary for workstation 110. Although memory 114 is shown as located on workstation 110, in other implementations, memory 114 may be separate but connectable to workstation 110.

As shown in FIG. 1, user 130 utilizes input device 135, such as a keyboard or a mouse, with workstation 110 to operate workstation 110. For example, user 130 may utilize input device 135 to direct processor 112 to access and execute rendering application 120 in memory 114. Rendering application 120 may process scene data 150 received from network 140 to generate a rendered output image 126 for output to display 118 through GPU 116. GPU 116 may correspond to a specialized processing unit for manipulating computer graphics for rendering by display 118. Display 118 may correspond to any display for rendering computer graphics, such as a CRT display, LCD, display, plasma display, or other suitable display. Network 140 may be a high-speed network suitable for high performance computing (HPC), for example a 10 GigE network. However, in other implementations network 140 may correspond to any network connection, such as a broadband network, wireless phone service communication network, or other network capable of sending of receiving data. Once completed, output image 128 may also be copied to non-volatile storage, not shown in FIG. 1.

For simplicity, it is assumed that output image 126 is only a single frame and that object geometry 154 already includes the positioning of all objects within the scene for the associated frame. However, in alternative implementations, scene data 150 may further include motion data for object geometry 154, in which case rendering application 120 may render several animation frames. Moreover, some implementations may render multiple frames of the same scene concurrently, for example to provide alternative camera angles or to provide stereoscopic rendering. Lighting 155 may include the properties of all light sources within the scene. Textures 156 may include all textures necessary for object geometry 154. Shaders 157 may include any shader necessary to correctly shade object geometry 154. Other data may also be stored in scene data 150, for example virtual camera parameters and camera paths.

Rays necessary for rendering application 120 are generated in memory 114 as rays 122. Rays 122 may sample radiance values as in a conventional ray-tracing algorithm. Rays 122 may correspond to camera rays, indirect rays resulting from a first scattering event, or rays projected from another light source. However, in other implementations, any kind of directional query may be utilized as rays 122. Thus, rays 122 may also sample visibility values, for example, to skip occluded points during shading, and may also track any other scene attribute. Moreover, rays 122 do not necessarily need to be rays and can also be any desired tracing shape, such as circular cones, elliptical cones, polygonal cones, and other shapes.

Object geometry 154 is streamed into memory 114 as individual work units or nodes, with an exemplary geometry node 124 as shown in FIG. 1. Geometry node 124 may include scene data 150 in large batches or a subset of data included in scene data 150. For example, geometry node 150 may include all objects in a scene from object geometry 154 or a subset of the objects. Geometry node 124 is processed against rays 122 using other elements of scene data 150 as needed, after which geometry node 124 may be freed from memory 114. Since all processing may be completed after freeing or deallocating the node from memory 114, each geometry node 124 of object geometry 154 may be accessed, and may also be skipped if the geometry node is not visible in the current scene.

Rays 122 are processed against geometry node 124 in order to receive intersection points 162, stored in shading buffer 160. In order to order intersection points 162 obtained after rays 122 are processed against geometry node 124, processor 112 further buckets or organizes intersection points 162 according to their element, creating element ID 164. Conventional sorting algorithms, such as a radix sort, may do the bucketing. Thus, element ID 162 contains intersection points 162 for the direction queries contained in rays 122 according to their element.

Processor 112 may further group intersection points contained in element ID 164 according to their texture, shading, or face, creating shading ID 126. Shading ID 126 may contain intersection points 162 organized by element from element ID 164 and further grouped according to their texture, shading, or face from shading ID 126. Thus rays 122 are reordered for coherent shading necessary for complex geometry. Thus, a separate thread can handle each of shading ID 164.

In one implementation, the above streaming of object geometry 154 is repeated for as many global illumination bounce passes as desired, for example 2-4 passes. Since performing only one pass is equivalent to ray casting, at least two passes may be done. Thus, by relying on memory 114 to provide sufficient memory space for all of rays 112 and the bandwidth of network 140 to efficiently stream the large amount of complex geometric data from object geometry 154, data coherency may be greatly improved by enabling streaming of object geometry 154 in naturally coherent nodes. As a result, complex caching schemes for geometry may be omitted, simplifying the implementation of rendering application 120.

Since each geometry node 124 is an individual work unit and can be processed without dependencies from other geometry nodes, servers 145a, 145b, and 145c may also be utilized for distributed parallel processing. Servers 145a, 145b, and 145c may contain components similar to those of workstation 110. SIMD (single instruction, multiple data) instructions on processor 112 and shaders on GPU 116 may be utilized to further enhance parallelism.

Figure 2:
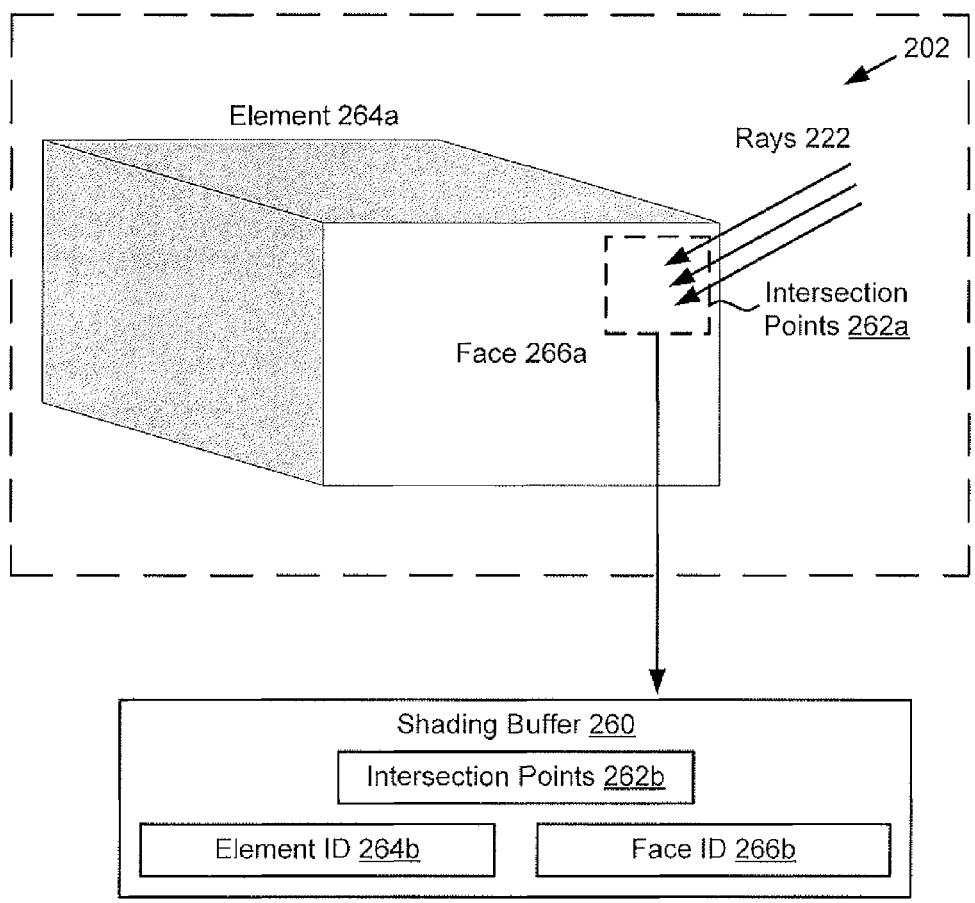
FIG. 2 shows an exemplary graphical rendering with ordered rays for coherent shading.

Moving to FIG. 2, FIG. 2 shows an exemplary graphical rendering with ordered rays for coherent shading. FIG. 2 shows scene environment 202 with element 264a having face 266a. Additionally shown are rays 222 intersecting face 266a at intersection points 262a. Although only 3 rays 222 and corresponding intersection points 262a are shown in scene environment 202 of FIG. 2, it is understood scene environment 202 may include additional or further rays 222 intersecting with face 266a. FIG. 2 also shows shading buffer 260 containing intersection points 262b, element ID 264b, and face ID 266b.

As shown in FIG. 2, scene environment 202 contains element 264a having face 266a and rays 222. Scene environment 202 may correspond to scene data streamed into a memory, for example a graphical node having all or part of object geometry from scene data. Scene environment 202 further contains rays 222, where rays 222 intersect with element 264a, specifically on face 266a. Rays 222 may be generated entirely within the memory after streaming in scene data. Rays 222 are then used to generate intersection points 262a. As each of rays 222 has an origin and direction, for the present discussion, only the nearest intersection point to the origin is necessary for shading. Thus, intersection points 262a show the intersection points of rays 222 nearest to the origin of rays 222.

Once intersection points 262a are generated, intersection points 262a can be stored in a memory, such as shading buffer 260 as intersection points 262b. After intersecting rays 222 with scene environment 202 and storing intersection points 262b in shading buffer 260, intersection points 262b may be organized by element 264a. For example, rays 222 that intersect with a part of element 264a may be organized as element ID 264a. Element ID 264a may reference the element and bucket those intersection points of intersection points 262b according to element 264a. Although intersection points 262b is grouped by element 264a into element ID 264b, other objects or scene data may be used for the initial bucketing of intersection points 262b corresponding to rays 222 in scene environment 202.

Element 264a may further contain materials, textures, or faces that can further separate parts of element 264a. For example, as shown in FIG. 2, element 254a contains face 266a. Face 266a may correspond to one aspect or face identifier of the element or object in scene environment 202. However, other features or textures of element 264a may be referenced and separated.

After organizing intersection points 262b according to element ID 264b, intersections points 262b in element ID 264b may be further grouped using face 266a in order to create face ID 266b. Face ID 266b contains intersection points 262b according to element 264a and further face 266a. Face ID 266b thus contains intersection points 262b used for shading sorted according to a shading context, such as a face ID, texture ID, and/or material ID of element 264a. In other implementations, element 264a may contain other subsets as previously discussed. Thus, intersection points 262b may be organized and grouped by different criteria. The criteria may depend on the scene environment 202 or may be chosen by the user according to a desired shading context for intersection points 262b.

Once intersection points 262b corresponding to rays 222 have to sufficiently grouped as described above, the intersection points can be shaded. By grouping intersection points into element ID 264b and face ID 266b, smaller caching may be used and the cache lifetime may be shortened. Thus, the next bounce of rays 222 used in ray tracing are already sorted leading to additional coherency as further bounces are conducted.

FIGS. 1 and 2 will now be further described by reference to FIG. 3, which presents flowchart 300 illustrating a method for ordering rays in rendered graphics for coherent shading. With respect to the method outlined in FIG. 3, it is noted that certain details and features have been left out of flowchart 300 in order not to obscure the discussion of the inventive features in the present application.

Figure 3:
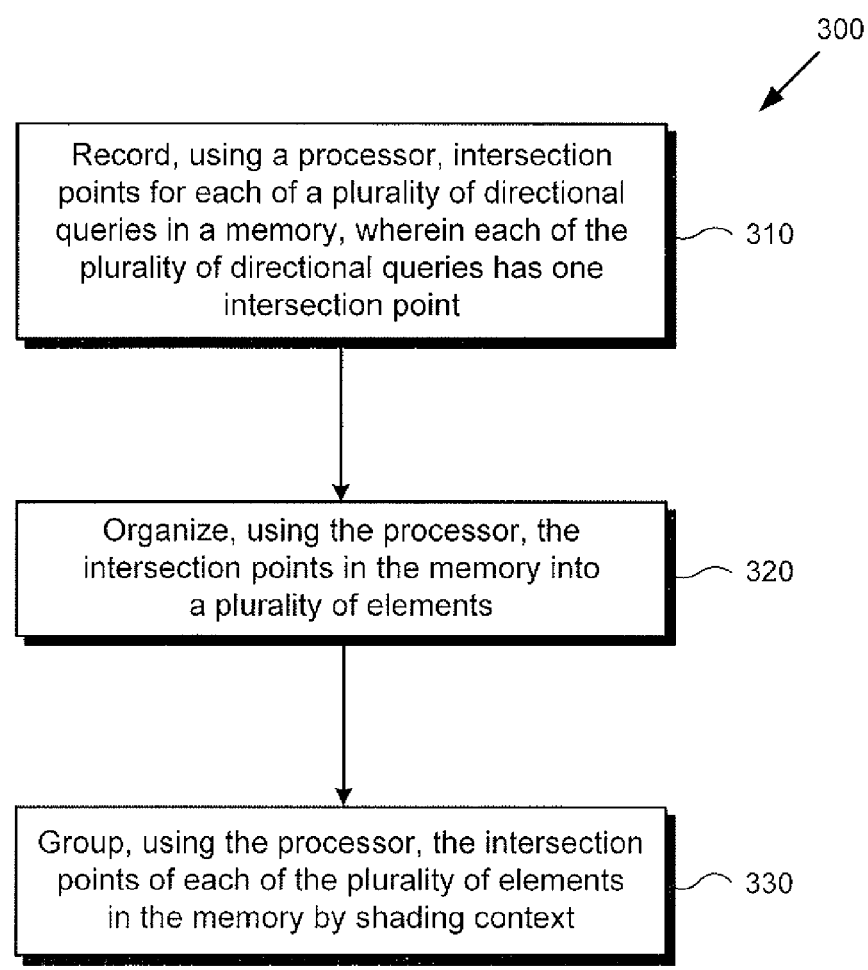
FIG. 3 presents an exemplary flowchart illustrating a method for ordering rays in rendered graphics for coherent shading.

Referring to FIG. 3 in combination with FIG. 1 and FIG. 2, flowchart 300 begins with recording, using a processor 112, intersection points 162/262a/262b for each of a plurality of directional queries in a memory 114, wherein each of the plurality of directional queries has one intersection point 162/262 (310). The recording may be performed by processor 112 of workstation 110 recording intersection points 162/262a/262b of rays 122/222 intersecting with geometry node 124 in large batches. Geometry node 124 may be streamed into memory 114 of workstation 110 from scene data 150 over network 140. As previously discussed, geometry node 124 may include all or part of object geometry 154. Rays 122/222 are generated from a ray-tracing algorithm and streamed into memory 114 from scene data 150.

As shown in FIG. 2, rays 222 are intersected with face ID 266a to receive intersection points 262a. As previously discussed, although only 3 intersection points 262a are shown in FIG. 2, more intersection points may occur. Thus, intersection points 262a may include intersection points for rays 222 across all of element 264a or any other geometry in geometry node 154. Processor 112 may then store intersection points 262a into memory 114 as intersection points 162/262b for sorting.

Flowchart 300 of FIG. 3 continues with organizing, using the processor 112, the intersection points 162/262a/262b in the memory 114 into a plurality of elements (320). The organizing may be performed processor 112 of workstation 110 organizing intersection points 162/262a/262b of rays 122/222 after intersection with geometry node 124. The element may be chosen as a specific element or geometry from geometry node 124 streamed into memory 114. Processor 112 may store intersection points 162/262a according to the element in memory 114, such as in element ID 164/264b of shading buffer 160/260. Thus, as previously discussed, element ID 164/264b may contain intersection points 162/262a/262b according to element chosen for element ID 264b. The method of FIG. 3 continues with grouping, using the processor 112, the intersection points 162/262a/262b of each of the plurality of elements in the memory 114 by shading context (330). The grouping may be performed by processor 112 of workstation 110 grouping the intersection points 162/262a/262b of rays 122/222 intersecting with face ID 266a. Processor 112 may group intersection points 262a shown intersecting face 162/262a/262b as face ID 266b in shading buffer 160/260. Face ID 266b thus contains those intersection points of intersection points 162/262a/262b in shading caches 160/260 that intersect with face 266a.

After intersection points 162/262a/262b are grouped according to a shading context such as face ID 266b, intersection points may be shaded. With normal ray tracing, reflection rays become spread out and incoherent. However, by grouping intersection points prior to shading, additional coherence can be realized for additional reflections.

Thus, by ordering and grouping ray intersection points according to elements and further by shading context, the system parallelizes well and each shading context can be handled by a separate thread. This allows for more coherent shading and faster image rendering.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system including a processor and a memory, the method comprising:
   ordering, using the processor, a plurality of directional queries in the memory;
   tracing the plurality of directional queries, using the processor, to determine a plurality of intersection points each corresponding to one of the plurality of directional queries;
   reordering, using the processor and after the tracing, the plurality of directional queries in the memory, wherein the reordering includes grouping the plurality of directional queries according to a plurality of shading contexts each corresponding to one of a plurality of shading groups, prior to coherent shading of the plurality of intersection points; and
   shading, after the reordering, the plurality of intersection points in each of the plurality of shading groups according to the corresponding one of the plurality of shading contexts, wherein the shading for at least two of the plurality of shading groups is performed in parallel.

2. The method of claim 1, wherein the shading context includes a volume of intersection points.

3. The method of claim 1, wherein the shading context is one of texture ID, material ID, and element ID.

4. The method of claim 3, wherein the texture ID is a mesh face ID.

5. The method of claim 1, wherein the plurality of elements is a plurality of object IDs.

6. The method of claim 1, wherein the plurality of directional queries includes directional path information for light sources in a scene.

7. The method of claim 1, wherein the plurality of directional queries uses a tracing shape.

8. The method of claim 7, wherein the tracing shape is one of a ray, a circular cone, elliptical cone, and polygonal cone.

9. A system comprising:
a memory; and
a processor configured to:
- order a plurality of directional queries in the memory;
- trace the plurality of directional queries to determine a plurality of intersection points each corresponding to one of the plurality of directional queries;
- reorder, after the tracing, the plurality of directional queries in the memory, wherein the reordering includes grouping the plurality of directional queries according to a plurality of shading contexts each corresponding to one of a plurality of shading groups, prior to coherent shading of the plurality of intersection points; and
- shade, after the reordering, the plurality of intersection points in each of the plurality of shading groups according to the corresponding one of the plurality of shading contexts, wherein the shading for at least two of the plurality of shading groups is performed in parallel.

10. The system of claim 9, wherein the shading context includes a volume of intersection points.

11. The system of claim 9, wherein the shading context is one of texture ID, material ID, and element ID.

12. The system of claim 11, wherein the texture ID is a mesh face ID.

13. The system of claim 9, wherein the plurality of elements is a plurality of object IDs.

14. The system of claim 9, wherein the plurality of directional queries includes directional path information for light sources in a scene.

15. The system of claim 9, wherein the plurality of directional queries uses a tracing shape.

16. The system of claim 15, wherein the tracing shape is one of a ray, a circular cone, elliptical cone, and polygonal cone.

* * * * *